United States Patent
Tanaka et al.

(10) Patent No.: US 6,618,107 B1
(45) Date of Patent: Sep. 9, 2003

(54) REFLECTION-TYPE COLOR LIQUID CRYSTAL DISPLAY DEVICE AND MANUFACTURING METHOD THEREOF

(75) Inventors: Mitsuhiro Tanaka, Yamatokoriyama (JP); Kazuya Yoshimura, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/648,782

(22) Filed: Aug. 28, 2000

(30) Foreign Application Priority Data

Sep. 6, 1999 (JP) .............................. 11-252233

(51) Int. Cl.[7] .......................................... G02F 1/1335
(52) U.S. Cl. ........................................ 349/106; 349/113
(58) Field of Search ............................... 349/106, 107, 349/108, 113, 114

(56) References Cited

U.S. PATENT DOCUMENTS

| | | | | |
|---|---|---|---|---|
| 5,663,019 A | * | 9/1997 | Matsumura et al. | ............. 430/7 |
| 5,998,805 A | * | 12/1999 | Shi et al. | ........................ 257/40 |
| 6,140,570 A | * | 10/2000 | Kariya | ........................ 136/256 |
| 6,172,726 B1 | * | 1/2001 | Matsute et al. | .............. 349/113 |
| 6,259,499 B1 | * | 7/2001 | Yamanashi | ................... 349/113 |

FOREIGN PATENT DOCUMENTS

| | | |
|---|---|---|
| JP | 63-210901 | 9/1988 |
| JP | 40705615 | * 3/1995 |
| JP | 09-166707 | 6/1997 |
| JP | 10-197860 | 7/1998 |
| JP | 11-2707 | 1/1999 |
| JP | 11-14809 | 1/1999 |
| JP | 11-038223 | 2/1999 |
| JP | 11-183921 | 7/1999 |

* cited by examiner

Primary Examiner—T. Chondhury
Assistant Examiner—Hoan Nguyen
(74) Attorney, Agent, or Firm—Edwards & Angell, LLP; David G. Conlin; Steven M. Jensen

(57) ABSTRACT

A reflection-type color liquid crystal display (LCD) device is made up of a reflecting film, a color filter in which a resin black matrix is formed between color patterns, and a liquid crystal layer, which are disposed in this order between a pair of glass substrates. Furthermore, a light transmissive protective film for protecting the reflecting film when electrodepositing is formed on the reflecting film, and on which an electrodepositing transparent conductive layer is formed, and on which the color filter is formed by an electrodeposition method, thereby accurately forming the resin black matrix which is suitable for reflection-type LCD devices on a reflectional function layer provided within a liquid crystal cell.

20 Claims, 8 Drawing Sheets

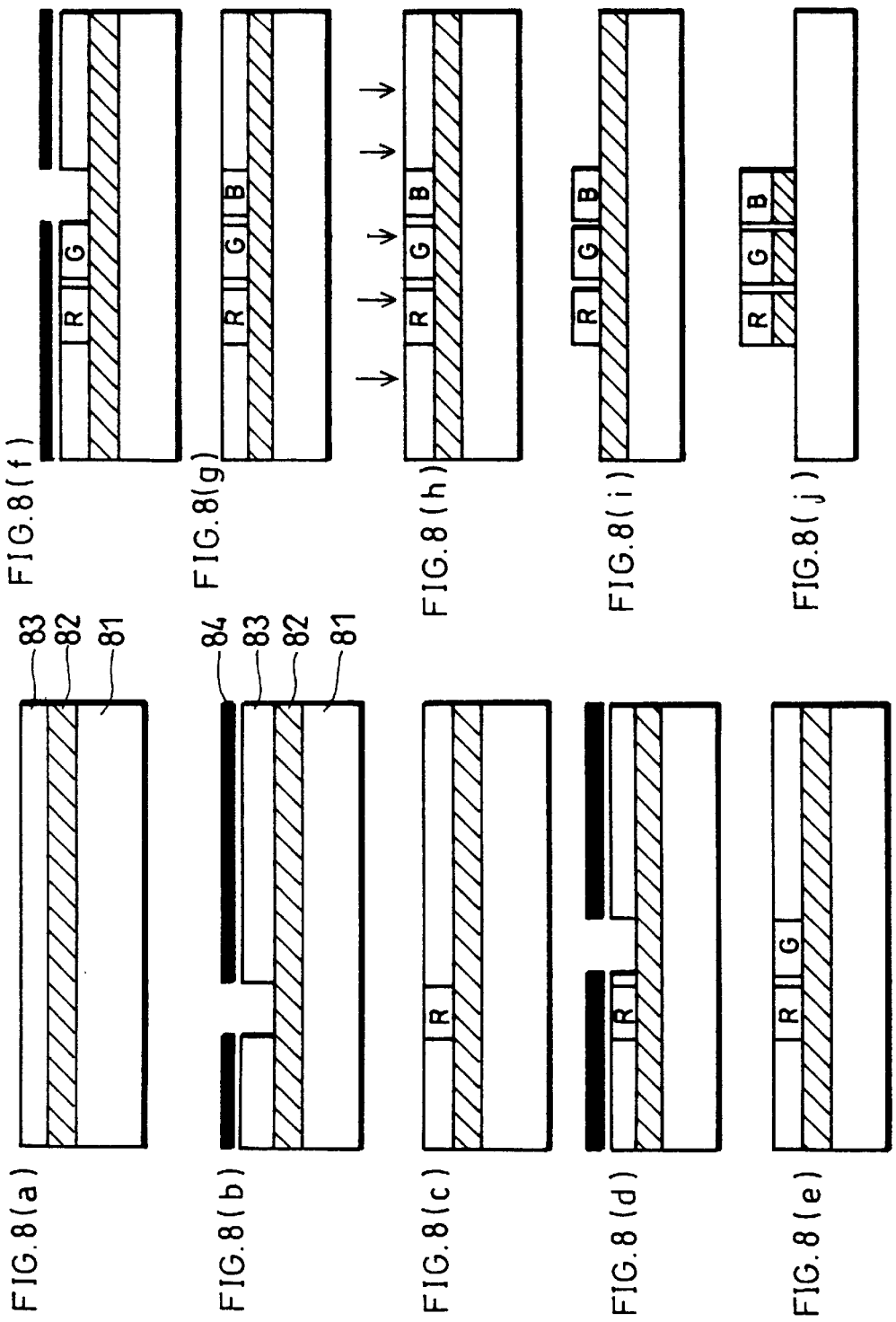

REFLECTION-TYPE COLOR LIQUID CRYSTAL DISPLAY DEVICE AND MANUFACTURING METHOD THEREOF

FIELD OF THE INVENTION

The present invention relates to a manufacturing method of a reflection-type color liquid crystal display device and to the reflection-type color liquid crystal display device.

BACKGROUND OF THE INVENTION

In recent years, a practical application of a liquid crystal display device to information devices such as word processors, laptop personal computers and pocket televisions has been developing rapidly. Among liquid crystal display devices, a reflection-type liquid crystal display device which carries out display by reflection of externally incident light in particular, has been focused because it does not require a backlight, and thus it is capable of suppressing power consumption and reducing thickness and weight. In addition, it has been proposed to attain a reflection-type color liquid crystal display device using a color filter.

In a liquid crystal display panel which carries out display with the use of the color filter and reflected light (hereinafter referred to as reflection-type color LCD device), in case where a reflecting plate and the color filter are provided apart, problems arise as to mixed colors due to parallax, and considerable reduction in reflectance and chroma.

In order to solve the foregoing problems, there has been proposed a reflection-type color LCD device having an arrangement in which the color filter and the reflecting plate are provided within a liquid crystal cell. In addition, the reflection-type color LCD device, unlike a transmissive color LCD device, utilizes surrounding external light, and thus a high-transmissive color filter is required for the reflection-type color LCD device.

However, for example, if luminance is increased by covering an entire aperture with a pale color filter so as to attain high transmissivity, color balance deteriorates due to different transmissivity in each RGB.

Accordingly, a reflection-type color LCD device for preventing this adverse effect is proposed, for example, in Japanese Unexamined Patent Publication No. 197860/1998 (Tokukaihei 10-197860 published on Jul. 31, 1998).

The reflection-type color LCD device disclosed in the above publication (Tokukaihei 10-197860) has an arrangement as shown in FIG. 6 in which a segment electrode 63 is provided between an upper substrate 61 and a liquid crystal layer 62, while a common electrode 65, a color filter 66 and a reflecting plate 67 are provided in this order from the side of the liquid crystal layer 62 between the liquid crystal layer 62 and a lower substrate 64.

The segment electrode 63 and the common electrode 65 are shaped into stripes and are orthogonally disposed, and a portion where the segment electrode 63 and the common electrode 65 intersect makes up an aperture, where a coverage of the aperture by the color filter 66 ranges from 40% to 80%. Further, a color filter which is produced by a dyeing process without a black matrix is proposed to be the color filter 66.

In the foregoing structure, since a black matrix is not used and the coverage of the aperture by the color filter 66 ranges from 40% to 80%, a high-luminance reflection-type color LCD device with excellent color balance can be provided.

However, in the structure where the color filter and the reflecting plate are provided within the liquid crystal cell, for example, the problem of detachment or deterioration of a metal oxide film, etc., which is a reflecting plate, arises when the reflecting plate or the color filter is adhered directly onto a glass substrate.

A technique for solving the foregoing problem is disclosed, for example, in Japanese Unexamined Patent Publication No. 14809/1999 (Tokukaihei 11-14809 published on Jan. 22, 1999).

A reflection-type LCD device disclosed in the above publication (Tokukaihei 11-14809) has an arrangement as shown in FIG. 7 which includes a reflecting medium 74 composed of a metal reflecting film 71 and silicon oxide films 72 and 73 which are provided on both surfaces of the metal reflecting film 71 having uneven surfaces, and a color filter 75 formed on a surface of the reflecting medium 74.

As such a color filter 75, color filters produced, for example, by the following methods are proposed: a pigment dispersing method in which a pattern is formed by applying a pigment-dispersed color filter forming resist over the reflecting medium 74, and a printing method in which a pattern which is formed on a print board is transferred onto the surface of the reflecting medium 74 through a blanket.

Further, the above publication (Tokukaihei 11-14809) also discloses that a black matrix is formed between color patterns of the color filter in order to improve contrast, etc. The black matrix includes those made of a metal thin film or resin including a black pigment.

As explained, since the silicon oxide film 72 is applied between the metal reflecting film 71, which is a part of the reflecting medium 74, and the color filter 75, it is possible to prevent the metal oxide film, etc. as a reflecting plate from being detached.

Further, an electrodeposition method as another method of forming a color filter is disclosed in Japanese Unexamined Patent Publication No. 210901/1988 (Tokukaisho 63-210901 published on Sep. 1, 1988).

In this electrodeposition method, as shown in FIG. 8(a), a transparent conductive layer 82 and a positive photosensitive resin composition layer 83 are formed on a substrate 81. In addition, as shown in FIG. 8(b), a positive mask 84 having a predetermined pattern is laid and exposed on the positive photosensitive resin composition layer 83, which are eluted with a predetermined eluate. Next, as shown in FIG. 8(c), a current is flown to the transparent conductive layer 82, and in an electrodeposition bath, for example, R (red) is electrodeposited on the transparent conductive layer 82. Further, as shown in FIGS. 8(d) through 8(g), repeating the same process causes the photosensitive resin composition layer 83 to include colored portions. Next, as shown in FIGS. 8(h) through 8(j), light exposure and elution in the eluate are performed on the entire surface, which results in forming a transparent conductive layer 82 on which filters of R (red), G (green) and B (blue) are placed.

The electrodeposition method presents such an advantage that manufacturing processes are simplified so as to allow manufacture of a color filter at lower costs than those by the conventional pigment dispersing method and the printing method.

Further, as another conventional example, a technique for enhancing reflectance of a reflecting film used for a reflection-type LCD device is, for example, disclosed in Japanese Unexamined Patent Publication No. 2707/1999 (Tokukaihei 11-2707 published on Jan. 6, 1999).

In the above publication (Tokukaihei 11-2707), it is disclosed that a first transparent film which is made of, for example, an ITO film is stacked on silver or silver alloy, and a second transparent film which is made of a silicon oxide film is further stacked thereon, which results in forming a so-called enhanced reflection film in which reflectance is enhanced. In addition, a condition of thickness of the first and second transparent films is given by $$(2m+1)\lambda/4n$$

(m: an integer of not less than 0,
λ: a wavelength of incident light).

Consequently, reflectance is enhanced with the use of silver or silver alloy instead of aluminum, and by considering the condition of film thickness.

Meanwhile, currently, the reflection-type color LCD device having a color filter within a liquid crystal cell requires that a black matrix, which is a light shielding film, be provided between patterns of the color filter so as to improve contrast.

However, when the black matrix is to be formed between patterns of the color filter in the conventional reflection-type color LCD device, the following problems arise:

① A metal black matrix, made of metal, has surface reflection and could block transmitted light in a transmissive LCD device. However, the metal black matrix has no light shielding effects when it is provided on the reflecting plate; and ② A low reflection metal black matrix made of low reflection metal can effectively suppress reflection by forming an oxide film on the surface of the metal black matrix. However, it presents a disadvantage in terms of cost.

Here, in order to solve these problems, a resin black matrix could be used. The resin black matrix is formed of resin including a black pigment.

However, the following problem arises in this method of forming a color filter to which the resin black matrix is added.

First, when forming a color filter with a resin black matrix by the pigment dispersing method, a color resist in which a pigment has been dispersed is applied on a glass substrate, and a predetermined pattern is obtained by exposure and development using a photomask which has been designed beforehand. Repeating these processes three times forms the respective hues of R (red), G (green) and B (blue). After that, a resin black matrix is formed by self alignment by back-face exposure, thereby accurately forming a color filter. That is, a black matrix can be formed without a spacing between color filter patterns.

However, the reflection-type raises the problem that the back-face exposure cannot be applied due to the presence of the reflecting plate.

Also, when forming a resin black matrix by the printing method, offset printing is performed on the resin black matrix after performing the offset printing on each of R, G and B. It is, however, difficult to control film thickness because each color of R, G and B and black matrix overlap each other. Moreover, color smears where the colors overlap one another.

Furthermore, when forming a resin black matrix by the dyeing method, dyeing is performed through exposure and development by a photolithography method after applying a photosensitive dyeing substrate. However, this method has problems in heat resistance, light resistance, etc. of the dyed color filter in respect of the use of a dyeing agent instead of pigments. Therefore, it is not practical to adopt the dyeing method.

SUMMARY OF THE INVENTION

It is an object of the present invention to provide a reflection-type color liquid crystal display device and manufacturing method thereof which can accurately form, on a reflectional function layer provided within a liquid crystal cell, a color filter including a resin black matrix suitable for reflection-type liquid crystal display devices.

A manufacturing method of the reflection-type color liquid crystal display (LCD) device of the present invention is for a reflection-type color LCD device in which a reflectional function layer, a color filter in which a resin black matrix is formed between color-filter color patterns, and a liquid crystal layer are sandwiched in this order between a pair of substrates, and in order to attain the foregoing object, includes the steps of:

forming on the reflectional function layer a light transmissive protective film for protecting the reflectional function layer when electrodepositing;

forming an electrodepositing transparent conductive layer on the protective film; and forming on the electrodepositing transparent conductive layer the color filter by an electrodeposition method.

The reflection-type color LCD device according to this method includes the reflectional function layer, the color filter in which the resin black matrix is formed between the color-filter color patterns, and the liquid crystal layer, which are sandwiched in this order between a pair of substrates.

By thus providing the color filter and the reflectional function layer within a liquid crystal cell, i.e. between a pair of substrates, it is possible to avoid problems of mixed colors due to parallax, and considerable reduction in reflectance and chroma which may arise when providing the reflectional function layer and the color filter via a substrate in between.

In addition, the light transmissive protective film is formed on the reflectional function layer in order to protect the reflectional function layer which is formed on one of the pair of substrates from adverse effects in electrodeposition of the color filter.

Further, the electrodepositing transparent conductive layer which is used as an electrodepositing electrode is formed on the protective film, and the color filter is formed on the electrodepositing transparent conductive layer by the electrodeposition method.

Here, in the present invention, the protective layer is provided under the electrodepositing transparent conductive layer.

This allows the conventionally problematic formation of the resin black matrix to be performed by the electrodeposition method without affecting the reflectional function layer, thus providing suitable means to form the color filter for the glass substrate having the reflectional function layer.

Namely, the resin black matrix as the light shielding film is formed in such a way that the resist provided between the color layers which have been formed in advance is removed entirely by exposure over the entire surface and development thereafter, so as to perform black electrodeposition on the exposed portion of the electrodepositing transparent conductive layer, making it possible to adopt a self alignment method which differs from the conventionally problematic methods such as the back-face exposure self alignment method and printing method in which colors may overlap.

Further, it is an important advantage of the present invention to form the protective film between the reflectional function layer and electrodepositing transparent conductive layer.

More specifically, in the conventional methods, when adopting the color filter by the electrodeposition method, a metallic thin film as the reflectional function layer, which has been formed on the glass substrate, is used as the electrodepositing electrode, and the color filter is electrodeposited on this metallic thin film.

However, a problem arises in this case: the metallic thin film cannot be used as the reflectional function layer because the metallic thin film melts during a development process of patterning the color-filter.

That is, in the conventional electrodeposition method, for example, a transparent conductive layer and a positive photosensitive resin composition layer are formed on a substrate. Then, a mask (positive mask) having a predetermined pattern is laid and exposed on this positive photosensitive resin composition layer, which are then eluted with a predetermined eluate. Next, a current is flown through the transparent conductive layer, and for example, color filters of red are electrodeposited on the transparent conductive layer in an electrodeposition bath. Repeating the same process, the photosensitive resin composition layer having colored portions is obtained. Next, by entire light exposure and elution in the eluate, a transparent conductive layer on which filters of R (red), G (green) and B (blue) are placed is formed. However, the electrodepositing electrode is corroded by a developer when eluting the positive photosensitive resin composition layer. Here, when using the metallic thin film as the electrodepositing electrode, the developer melts the metallic thin film, and the metallic thin film cannot be used as the reflectional function layer.

Meanwhile, as the method of protecting the metallic thin film, there has been a known method of forming a color filter by using a pigment dispersing method or a printing method, and by forming a silicon oxide film on a metallic thin film so that resistance to resist stripper is given when forming the color filter.

However, in the case of forming the silicon oxide film on the metallic thin film, the electrodeposition method cannot be used to form the color filter because the silicon oxide film does not have electric conductivity.

Accordingly, in order to solve the foregoing problems, in the present invention, the light transmissive protective film for protecting the reflectional function layer in electrodeposition is formed on the reflectional function layer, and the electrodepositing transparent conductive layer is formed on the protective film, then, the color filter is formed on the electrodepositing transparent conductive layer by the electrodeposition method.

By thus forming the protective film on the reflectional function layer, the reflectional function layer is prevented from deteriorating when electrodepositing the color filter, and the color filter can be electrodeposited because the electrodepositing transparent conductive layer is provided. Additionally, the color filter formed by the electrodeposition method has superior film flatness compared with color filters formed by other methods such as the pigment dispersing method and printing method, and it is possible to form a thin film and increase transmissivity with ease. Furthermore, with regard to the color filter formed by the electrodeposition method, it is possible to form a film of uniform thickness regardless of whether the reflectional function layer is of a specular form or of an irregular form. Therefore, the color filter is suitable for reflection-type LCD devices.

As a result, it is possible to provide a manufacturing method of the reflection-type color LCD device which can accurately form the color filter including the resin black matrix which is suitable for reflection-type LCD devices on the reflectional function layer provided within a liquid crystal cell.

Further, in order to attain the foregoing object, the reflection-type color LCD device of the present invention has an arrangement which includes:

a pair of substrates, a reflectional function layer, a light transmissive protective film for protecting the reflectional function layer when electrodepositing, an electrodepositing transparent conductive layer, a color filter in which a resin black matrix is formed between color-filter color patterns of plural colors, and a liquid crystal layer, the reflectional function layer, the light transmissive protective film, the electrodepositing transparent conductive layer, the color filter and the liquid crystal layer being formed in this order from one of the pair of substrates.

In the foregoing structure, it is arranged such that the pair of substrates sandwich the reflectional function layer, the color filter in which the resin black matrix is formed between the color-filter color patterns of plural colors, and the liquid crystal layer, which are formed in this order.

By thus providing the color filter and the reflectional function layer within the liquid crystal cell, i.e. between the pair of substrates, it is possible to avoid problems such as mixed colors caused by parallax, and considerable reduction in reflectance and chroma, as observed in the case where the reflectional function layer and the color filter are disposed via a substrate in between.

Further, in the foregoing structure, it is arranged such that the light transmissive protective film for protecting the reflectional function layer in electrodeposition is provided on the reflectional function layer which is provided on one of the pair of substrates, and the electrodepositing transparent conductive layer is provided on the protective film, and on the electrodepositing transparent conductive layer there is provided the color filter which is composed of the color layers which are composed of the color-filter color patterns of plural colors formed by electrodeposition and the resin black matrix which was formed by electrodeposition between spacings of the color layers composed of the color-filter color patterns of plural colors.

Namely, the light transmissive protective film for protecting the reflectional function layer in electrodeposition is formed on the reflectional function layer, and the electrodepositing transparent conductive layer is formed on the protective film, and the color filter is formed on the electrodepositing transparent conductive layer by the electrodeposition method.

By thus forming the protective film on the reflectional function layer, the reflectional function layer is prevented from deteriorating when electrodepositing the color filter, and the color filter can be electrodeposited because the electrodepositing transparent conductive layer is provided.

Additionally, the color filter formed by the electrodeposition method has superior film flatness compared with color filters formed by other methods such as the pigment dispersing method and printing method, and it is possible to form a thin film and increase transmissivity with ease. Furthermore, with regard to the color filter formed by the electrodeposition method, it is possible to form a film of uniform thickness regardless of whether the reflectional function layer is of a specular form or of an irregular form. Thus, this color filter is suitable for reflection-type LCD devices.

As a result, it is possible to provide the reflection-type color LCD device which can accurately form the color filter including the resin black matrix which is suitable for reflection-type LCD devices on the reflectional function layer provided within the liquid crystal cell.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 8(a) through 8(j) are explanatory drawings showing a method of forming a color filter by an electrodeposition method in a conventional liquid crystal display device.

DESCRIPTION OF THE EMBODIMENTS

FIRST EMBODIMENT

Figure 1:
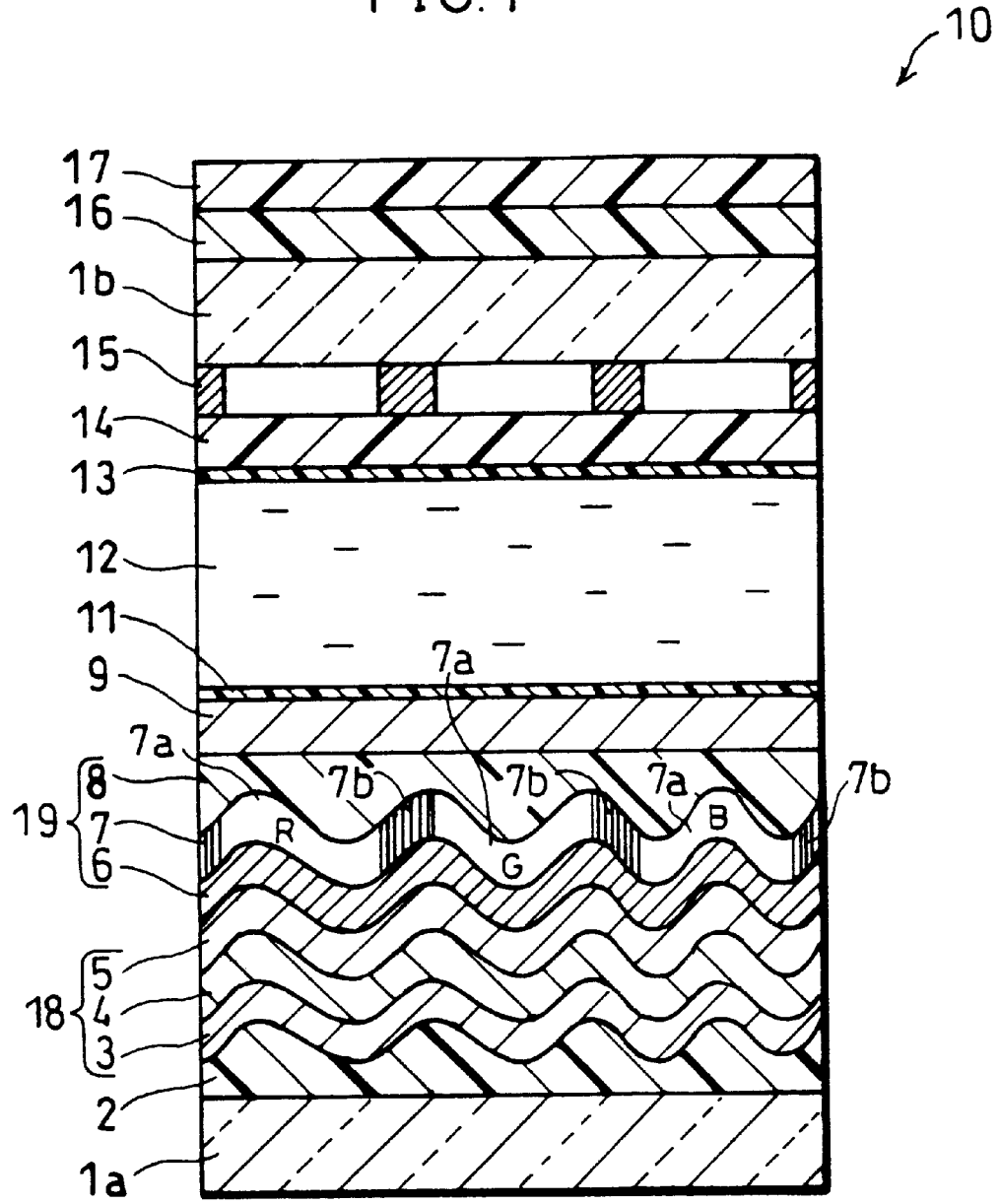
FIG. 1 is a cross section showing a diffuse-reflection-type color liquid crystal display device as one example of a reflection-type color liquid crystal display device according to one embodiment of the present invention.
Figure 2:
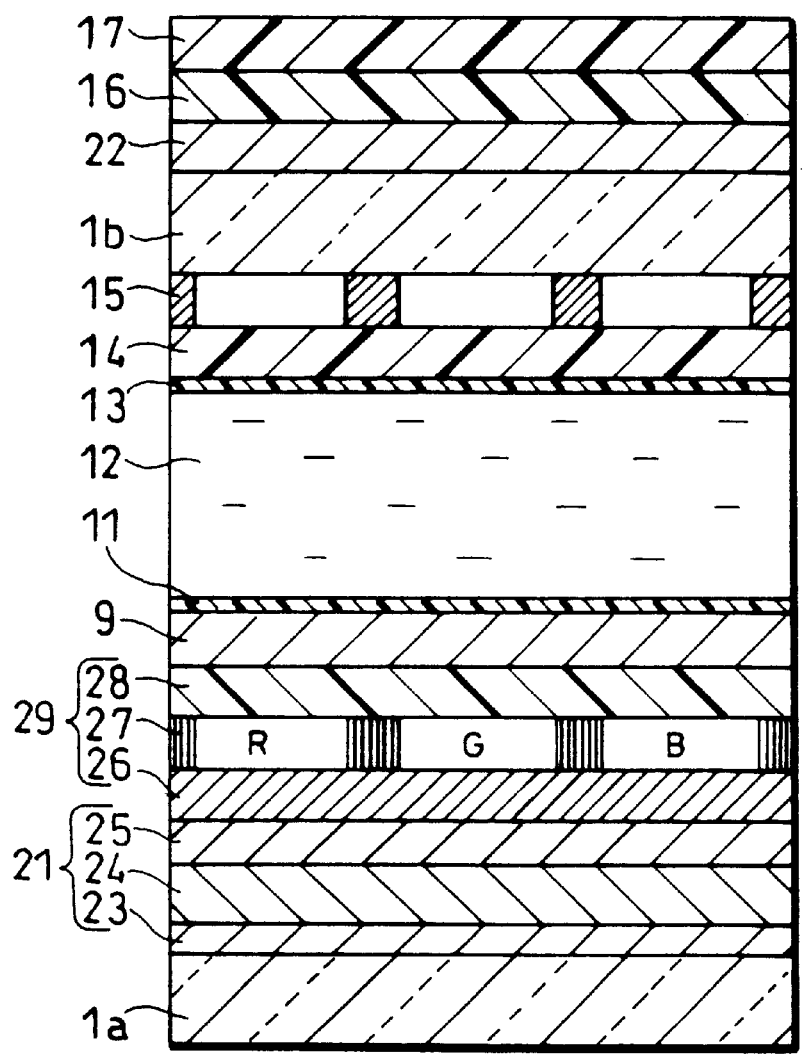
FIG. 2 is a cross section showing a specular reflection-type color liquid crystal display device as another example of the reflection-type color liquid crystal display device according to the embodiment.

The following will explain one embodiment of the present invention with reference to FIGS. 1 and 2.

A reflection-type color liquid crystal display device (hereinafter referred to as reflection-type color LCD device) 10 is, as shown in FIG. 1, made up of a reflecting film 4 as a reflectional function layer, a color filter 7 in which a resin black matrix 7b is formed between color patterns 7a, and a liquid crystal layer 12, which are provided in this order between a pair of glass substrates 1a and 1b.

More specifically, the following layers are disposed in this order on the glass substrate 1a: an undercoating irregular layer 2 made of resin, an undercoat film 3 made of silicon oxide having irregularities along the undercoating irregular layer 2, the reflecting film 4 made of aluminum (Al) having irregularities along the undercoat film 3, a protective film 5 made of silicon oxide, an electrodepositing transparent conductive layer 6 which becomes an electrodepositing electrode when forming the color filter 7, the color filter 7, an overcoat layer 8 as a leveling film, a lower driving electrode Indium Tin Oxide (ITO) 9, an alignment film 11, the liquid crystal layer 12, an alignment film 13, a top coat 14, an upper driving electrode ITO 15, the glass substrate 1b, phase difference plate 16 and a polarizing plate 17.

A reflecting medium 18 is composed of the undercoat film 3, the reflecting film 4 and the protective film 5. In addition, a color-filter layer 19 is composed of the electrodepositing transparent conductive layer 6, the color filter 7 and the overcoat layer 8.

The undercoat film 3 and the protective film 5 of the reflecting medium 18 are, as discussed, made of silicon oxide, and more specifically $SiO_2$. However, material is not limited to this, and SiO can also be used therefor. In addition, the protective film 5 is not necessarily made of silicon oxide. As discussed below, the protective film 5 is provided for the purpose of protecting the reflecting film 4 and preventing the reflecting film 4, for example, from being detached in electrodeposition when forming the color filter 7 by an electrodeposition method. Accordingly, any light transmissive film for protecting the reflecting film 4 in electrodeposition which can satisfy these functions can be used instead of the silicon oxide film.

Further, the reflecting film 4 is made of metal, and more specifically, the material is aluminum in the present embodiment. Note that, the reflecting film 4 is not necessarily made of aluminum, and, for example, a reflecting film made of metal such as silver and silver alloy can also be used, or is rather preferred because silver, silver alloy, etc. have higher reflectance than aluminum.

The reflecting medium 18 here is an example of a diffuse reflection plate. Therefore, the reflecting medium 18 is formed to have irregularities so that incident light, for example, from above is reflected irregularly at the reflecting film 4.

In order to form the reflecting medium 18 to have irregularities to make it the diffuse reflection plate, the undercoating irregular layer 2 is first formed to have irregularities on the glass substrate 1a.

A method of forming the undercoating irregular layer 2 to have irregularities includes:
① the method of forming irregularities by exposing a photosensitive resin;
② the method of forming irregularities by heating a resin film;
③ the method of forming irregularities by pressing a resin film against a metal mold; and
④ the method of forming irregularities by processing a substrate by etching, etc.

Next, the undercoat film 3 made of $SiO_2$ the reflecting film 4 made of Al, the protective film 5 made of $SiO_2$ and the electrodepositing transparent conductive layer 6 made of ITO are stacked in this order on the undercoating irregular layer 2 to fit the irregularities of the undercoating irregular layer 2.

Such irregularities extend over the color filter 7 which is stacked on top of the foregoing layers and films. In addition, the irregularities of the color filter 7 are levelled by the overcoat layer 8.

Note that, although the reflecting medium 18 is an example of the diffuse reflection plate, the reflecting medium is not necessarily limited to this. For example, as shown in FIG. 2, it is also possible to provide a reflection-type color LCD device 20 having a reflecting medium 21 made of a specular reflection plate.

The reflecting medium 21 is composed of an undercoat film 23 of a flat film, a reflecting film 24 as a reflectional function layer and a protective film 25. Note that, the reflecting medium 21 includes the reflecting film 24 which is flat, i.e. a specular plane, thereby attaining regular reflection at the reflecting film 24. Consequently, the undercoating irregular layer 2 which is provided in the reflection-type color LCD device 10 for making the reflecting medium 18 to have irregularities does not exist in the reflection-type color LCD device 20.

However, instead of the undercoating irregular layer 2, a front diffuse plate 22 is provided between the glass substrate 1b and the phase difference plate 16. The front diffuse plate 22 is effectively utilized in, for example, color LCD devices adopting an edge light unit system or a backlight system.

Note that, the undercoat film 23 and the protective film 25 are also made of $SiO_2$.

Further, since the reflecting medium 21 is formed flat in the reflection-type color LCD device 20, a color-filter layer 29 composed of an electrodepositing electrode 26, a color filter 27 and an overcoat layer 28, which is stacked on the reflecting medium 21, is also formed flat.

The following will explain the color-filter layer 19 in the reflection-type color LCD device 10 shown in FIG. 1.

As explained, the color-filter layer 19 is composed of the electrodepositing transparent conductive layer 6, the color filter 7 and the overcoat layer 8.

The electrodepositing transparent conductive layer 6 is an electrodepositing electrode used to electrodeposit the color filter 7 and is formed over an entire display area.

In addition, the overcoat layer 8, which is made of transparent resin, protects the color filter 7 while leveling a surface to be combined with the lower driving electrode ITO 9.

The foregoing color filter 7 is composed of the resin black matrix 7 formed between the color patterns 7a of three primary colors of R (red), G (green) and B (blue).

As discussed, the color filter 7 is formed by the electrodeposition method. The following will explain a manufacturing method of the color filter 7:

① First, the electrodepositing transparent conductive layer 6 is formed on the protective film 5 made of $SiO_2$ in the reflecting medium 18 which is formed on the glass substrate 1a.

Here, when the protective film 5 made of $SiO_2$ does not exist in the reflecting medium 18, a film made of $SiO_2$ is formed in advance, then, the electrodepositing transparent conductive layer 6 is formed.

② Next, the photosensitive resin composition layer is formed on the electrodepositing transparent conductive layer 6.

③ Further, after exposing the photosensitive resin composition layer through a mask (positive mask) having a predetermined pattern, the exposed portion is removed so as to expose the surface of the electrodepositing transparent conductive layer 6.

④ Further, color layers of R, for example, are formed by electrodeposition on the exposed portion of the electrodepositing transparent conductive layer 6.

⑤ Finishing formation of the color layers of R, processes ③ and ④ are repeated so as to provide the other color layers of the respective hues G and B.

⑥ Further, a whole area of a resist of the photosensitive resin composition layer between the color patterns 7a of R, G and B is exposed so as to remove the photosensitive resin composition.

⑦ Then, black is electrodeposited on the exposed portion of the electrodepositing transparent conductive layer 6, i.e. between the color patterns 7a.

⑧ Finally, the overcoat layer 8 is formed on the color filter 7.

As a result, the color-filter layer 19 is provided. Note that, detailed explanation for this resist direct electrodeposition method is disclosed in "Technique for manufacturing a color filter for a liquid crystal panel" (published on Dec. 18, 1991, by Triceps, pp. 147–157).

Here, in the present embodiment, the color filter 7 is formed in the following sequence: the reflecting film 4, the protective film 5 made of $SiO_2$, the electrodepositing transparent conductive layer 6, then, the color filter 7.

Namely, by forming the $SiO_2$ film on the metallic reflecting film 4, the reflecting film 4 made of metal is prevented from deteriorating in the electrodeposition of the color filter 7, and the electrodeposition of the color filter 7 is made possible by providing the electrodepositing transparent conductive layer 6 as the electrodepositing electrode.

Accordingly, it is required for protecting the metallic reflecting film 4 that the transparent conductive layer 6 be formed over an entire display area.

The following will explain in order a manufacturing method of the glass substrate 1a through the color-filter layer 19 making up the reflection-type color LCD device 10.

Initially, after forming the undercoating irregular layer 2 with resin on the glass substrate 1a, the undercoat film 3 made of $SiO_2$, the reflecting film 4 made of Al, the protective film 5 made of $SiO_2$ and the electrodepositing transparent conductive layer 6 made of ITO are formed on the undercoating irregular layer 2.

The $SiO_2$ film on the reflecting film 4 made of Al has a role of the protective film of the reflecting film 4 in patterning the color filter 7, and the electrodepositing transparent conductive layer 6 made of ITO a role of the electrode in the electrodeposition of the color patterns 7a and the resin black matrix 7b of the color filter 7.

Consequently, in the foregoing structure, formation of the resin black matrix, which has conventionally been problematic, can be performed without affecting the reflecting film 4.

Here, in the reflection-type color LCD device 10 of the present embodiment, the color-filter layer 19 is provided outside of a region between a pair of electrodes for driving the liquid crystal, i.e. the lower driving electrode ITO 9 and the upper driving electrode ITO 15, because such a disposition is preferable in preventing display from being affected.

Next, in the reflection-type color LCD device 10 of the present embodiment, the electrodepositing transparent conductive layer 6, which is no longer required after forming the color filter 7, is utilized as an enhanced reflection film.

More specifically, the electrodepositing transparent conductive layer 6 is not required unless it is used to form the color filter 7 by the electrodeposition method. In addition, once the color filter 7 is formed, the electrodepositing transparent conductive layer 6 can usually be omitted except for its function of preventing detachment of layers between the reflecting film 4 and the color filter 7 by improving their adhesion. However, it is possible by devising the protective film 5 and the transparent conductive layer 6 to make these layers enhanced reflection films, i.e. increase reflectance.

Namely, reflectance can be increased by having an Al/$SiO_2$/ITO structure in which the protective film 5 made of silicon oxide ($SiO_2$) and the electrodepositing transparent conductive layer 6 made of Indium Tin Oxide (ITO) which becomes an electrodepositing electrode when forming the color filter 7 are stacked on the reflecting film 4 made of aluminum (Al). In addition, the Al/$SiO_2$/ITO structure also has the effect of color correction. Note that, an Al/ITO structure in which an $SiO_2$ protective film is not provided cannot exhibit the effect of increased reflectance and color correction.

Furthermore, the Al/ITO structure may raise the following problem in the manufacturing process.

The glass substrate 1a is masked in the process of forming an Al film thereon, and the Al film is formed only in a liquid crystal device (masking deposition). Afterward, the ITO is deposited for electrodeposition over a whole surface. Here, in the Al/ITO structure, it is deemed that electrodeposition becomes difficult because variation of resistance values within the surface of the substrate is caused by formation of an Al/ITO region and a sole ITO region in the Al/ITO structure.

Note that, an electrodeposition experiment was conducted with regard to an Ag/ITO structure in which an ITO film with a thickness of 50 Å was formed directly on the reflecting film 4 which is made of Ag or Ag alloy instead of Al, and the result of which was such that Ag eluted. This may be due to a weak protective effect obtained by using only the ITO film. Accordingly, the present invention has adopted the Al/SiO$_2$/ITO structure in which the protective film made of SiO$_2$ is provided.

Meanwhile, if it is assumed that light is incident on the reflecting medium 18 perpendicularly, the thickness of each of the protective film 5 and the electrodepositing transparent conductive layer 6 is set to satisfy $$(2m+1)\lambda/4n,$$

where m is an integer of not less than 0, λ is a wavelength of incident light, and n is a refractive index of each film.

In this way, it is possible to ensure light-transmissivity of the protective film 5 and the electrodepositing transparent conductive layer 6, while increasing spectral reflectance of light in the visible light spectrum.

More specifically, reflectance can be increased by setting the thickness of the protective film 5 made of SiO$_2$ to satisfy $(2m+1)\lambda/4n_1$, and the thickness of the electrodepositing transparent conductive layer 6 made of ITO $(2m+1)\lambda/4n_2$.

Here, when the wavelength of the incident light λ=5,800 Å, values of refractive indices n of SiO$_2$ and ITO become $n_1=1.46$ and $n_2=1.78$, respectively.

In addition, it is assumed in the foregoing equations that the angle of incidence of ideal incident light on an external light reflection display is 30°, i.e. light is incident on a reflecting plate at an angle of 30° with respect to normal to the surface of the reflecting plate.

Consequently, when m=0, desired thicknesses are calculated as follows:

SiO$_2$: $(2m+1)\lambda/4n_1 \times \cos 30° = 850$ Å

ITO: $(2m+1)\lambda/4n_2 \times \cos 30° = 700$ Å.

Thus, the thickness of the protective film 5 made of SiO$_2$ is set at 850 Å, and the thickness of the electrodepositing transparent conductive layer 6 made of ITO is set at 700 Å.

Further, as for each thickness of the reflecting medium 18 and the color-filter layer 19, the undercoat film 3 made of SiO$_2$ is set at 150 Å, the reflecting film 4 made of Al 1,000 Å, the protective film 5 made of SiO$_2$ 850 Å, and the electrodepositing transparent conductive layer 6 700 Å.

Note that, since the object of the present embodiment is to form the color filter 7 having the resin black matrix 7b which is most suitably used in the reflection-type color LCD device 10, the thickness of each layer is not limited to the foregoing value.

However, as shown in data of Examples below, it is preferable that the film thickness of the ITO of the electrodepositing transparent conductive layer 6 ranges from not less than 600 Å to not more than 800 Å because the ITO is expected to have the effect of the enhanced reflection film with such a thickness.

Figure 5:
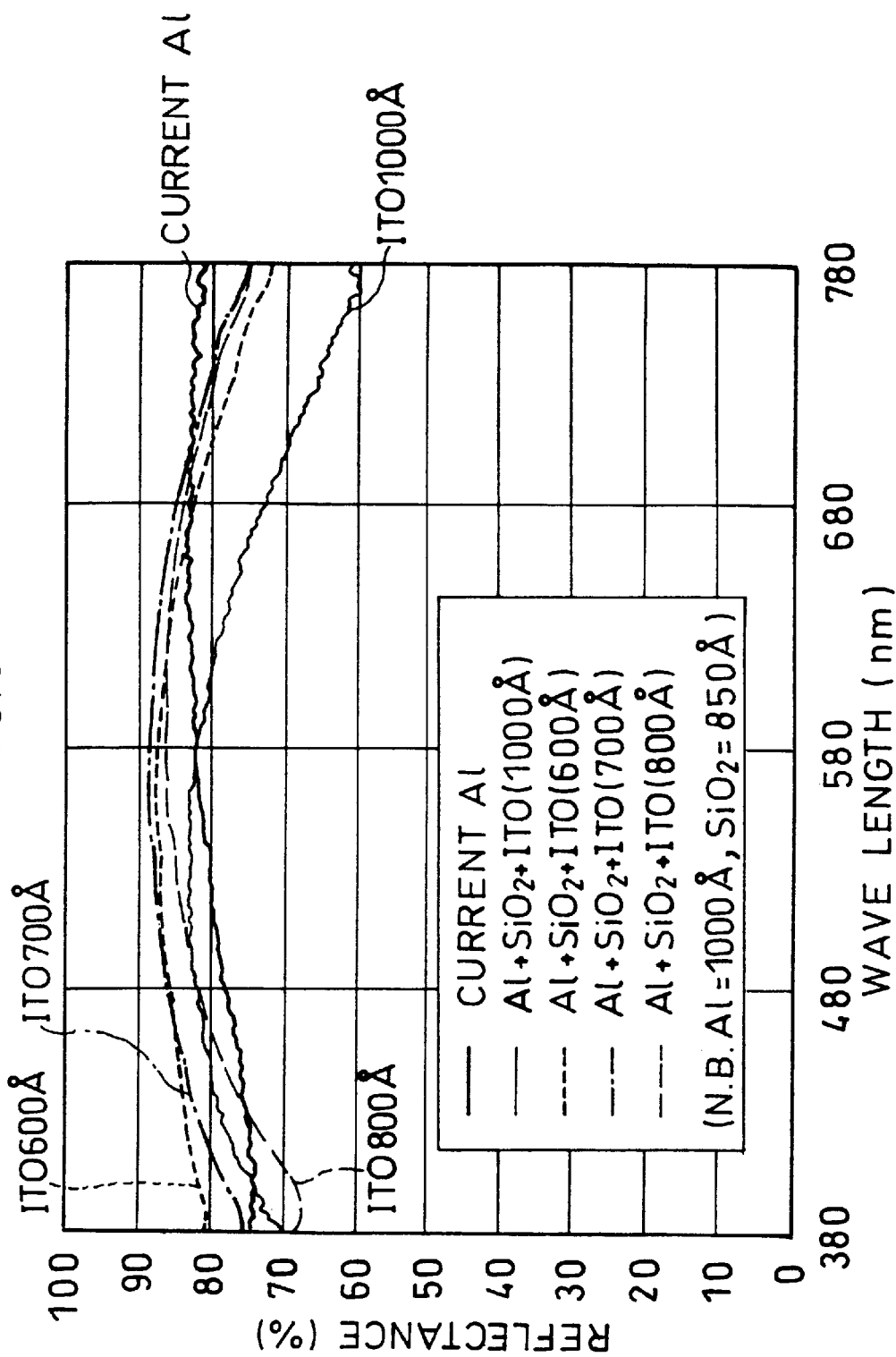
FIG. 5 is a graph showing an effect of thickness of a protective film on reflectance, the protective film being formed on an upper side of a reflecting medium in the reflection-type color liquid crystal display device.
Figure 6:
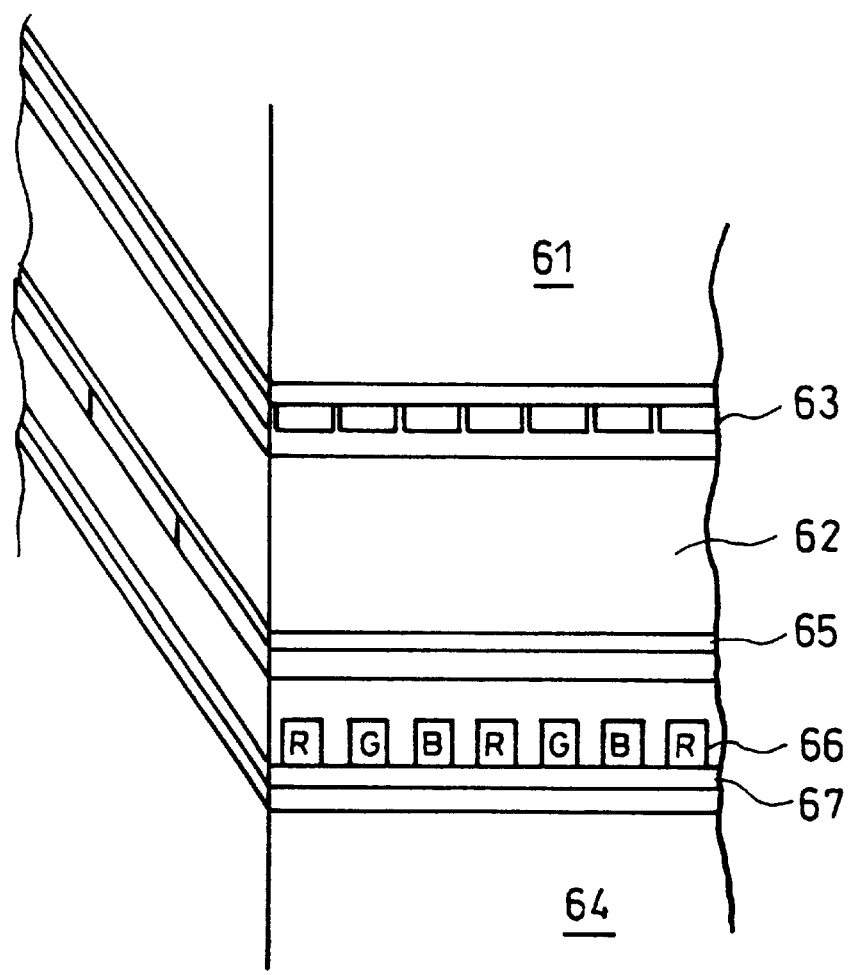
FIG. 6 is a cross section showing a structure of a conventional reflection-type color liquid crystal display device.
Figure 7:
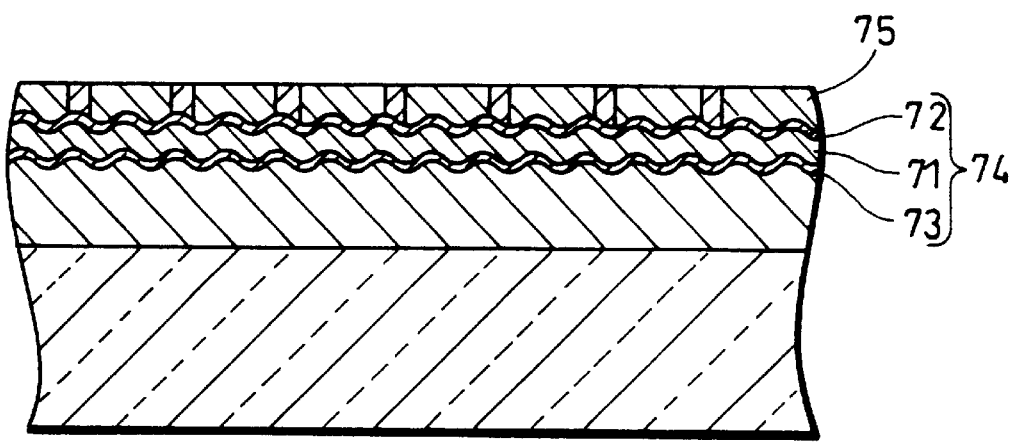
FIG. 7 is a cross section showing a structure of another conventional reflection-type color liquid crystal display device.

The following will explain the preferable film thickness of the ITO with reference to a graph of FIG. 5 which shows how the film thickness of the ITO influences reflectance.

When the film thickness of the ITO is 1,000 Å, reflectance decreases in general in comparison with the case of current Al (Al only). In addition, almost no increase in reflectance is observed at the wavelength of 550 nm which contributes to visibility.

When the film thickness of the ITO is 600 Å or 700 Å, increase in reflectance is observed at the wavelength of 550 nm which contributes to visibility, and additionally, reflectance with respect to the wavelength is almost constant, and only slight coloration is observed. Moreover, since it is advantageous with respect to electrodeposition to have the electrodeposited ITO with a low resistance value, it is considered that the ITO of 700 Å is best suited.

Further, the resistance of the ITO becomes high when the film thickness of the ITO is less than 600 Å. When the resistance of the ITO as the electrodepositing electrode is high when electrodepositing the color filter, a voltage becomes non-uniform over the surface of the substrate, which causes variation in film thickness of the color filter over the surface of the substrate. Such variation of the film thickness of the color filter results in non-uniform display.

When the film thickness of the ITO is 800 Å, increase in reflectance is observed at the wavelength of 550 nm which contributes to visibility, and thus the ITO of 800 Å is preferable.

On the other hand, if the film thickness of the ITO exceeds 800 Å, only a slight increase in reflectance is observed at the wavelength of 550 nm, and yellow coloration is observed.

Therefore, the film thickness of the ITO which is not less than 600 Å and not more than 800 Å is preferable because the film thickness in this range does not cause the problem of variation in film thickness of the electrodeposited color filter over the surface and increases reflectance.

Note that, this condition of film thickness is the same for the specular reflection-type color LCD device 20 shown in FIG. 2 in which the thickness of each layer of the reflecting medium 21 is as follows: the undercoat film 23 made of SiO$_2$ is 150 Å, the reflecting film 24 made of Al 1,000 Å, the protective film 25 made of SiO$_2$ 850 Å, and the electrodepositing electrode 26 made of SiO$_2$ in the color-filter layer 29 700 Å.

The foregoing reflection-type color LCD device 10 and the manufacturing method thereof have made it possible to provide the manufacturing method of the color filter 7 which is provided in the cell with the resin black matrix 7b suitable for reflection-type liquid crystal display devices. Moreover, an effective use of the protective film 5 made of a silicon oxide film, which is provided on the reflecting film 4 for protection, and the electrodepositing transparent conductive layer 6, both as the enhanced reflection films is realized, and improvement in reflectance was achieved without adding a process.

Thus, the reflection-type color LCD device 10 of the present embodiment has an arrangement in which a pair of the glass substrates 1a and 1b sandwich the reflecting film 4, the color filter 7 made up of the resin black matrix 7b formed between the color patterns 7a, and the liquid crystal layer 12 in this order.

In the foregoing structure, the color filter 7 and the reflecting film 4 are provided within a liquid crystal cell, i.e. between a pair of the glass substrates 1a and 1b. Accordingly, it is possible to avoid problems of mixed colors due to parallax, and considerable reduction in reflectance and chroma, which may arise when providing the glass substrate 1a or 1b between the reflecting film 4 and the color filter 7.

In manufacturing the reflection-type color LCD device 10, the light transmissive protective film 5 is formed on the reflecting film 4 that has been formed on the glass substrate 1a. This protective film 5 is provided to protect the reflecting film 4 from an adverse effect when electrodepositing the color filter 7.

Then, the electrodepositing transparent conductive layer 6 used as the electrodepositing electrode is formed on the protective film 5, and the color filter 7 is formed on the electrodepositing transparent conductive layer 6 by the electrodeposition method.

In the present embodiment, the protective film 5 is provided under the electrodepositing transparent conductive layer 6.

This allows the conventionally problematic formation of the resin black matrix 7b to be performed by the electrodeposition method without affecting the reflecting film 4, thus providing suitable means to form the color filter 7 for the glass substrate 1a having the reflecting film 4.

Namely, the resin black matrix 7b as the light shielding film is formed in such a way that the resist between the color patterns 7a which have been formed in advance is removed entirely by exposure over the entire surface and development thereafter, so as to perform black electrodeposition on the exposed portion of the electrodepositing transparent conductive layer 6, making it possible to adopt a self alignment method which differs from the conventionally problematic methods such as the back-face exposure self alignment method and printing method in which colors may overlap.

In addition, it is also an important advantage of the present embodiment to form a protective film between the reflecting film 4 and the electrodepositing transparent conductive layer 6.

Namely, in the conventional methods, when adopting the color filter 7 by the electrodeposition method, a metallic thin film as the reflectional function layer, which has been formed on the glass substrate 1a, is used as the electrodepositing electrode, and the color filter 7 is electrodeposited on this metallic thin film.

However, a problem arises in this case: the metallic thin film cannot be used as the reflectional function layer because the metallic thin film melts during a development process of patterning the color-filter.

That is, in the conventional electrodeposition method, for example, a transparent conductive layer and a positive photosensitive resin composition layer are formed on a substrate. Then, a mask (positive mask) having a predetermined pattern is laid and exposed on this positive photosensitive resin composition layer, which are then eluted with a predetermined eluate. Next, a current is flown through the transparent conductive layer, and for example, a color filter of red is electrodeposited on the transparent conductive layer in an electrodeposition bath. Repeating the same process, the photosensitive resin composition layer having colored portions is obtained. Next, by entire light exposure and elution in the eluate, a transparent conductive layer on which filters of R (red), G (green) and B (blue) are placed is formed. However, the electrodepositing electrode is corroded by the developer when eluting the positive photosensitive resin composition layer.

Here, when using the metallic thin film as the electrodepositing electrode, the developer melts the metallic thin film, and the metallic thin film cannot be used as the reflectional function layer.

Meanwhile, as the method of protecting the metallic thin film, there has been a known method of forming a color filter by using a pigment dispersing method or a printing method, and by forming a silicon oxide film on a metallic thin film so that resistance to resist stripper is given when forming the color filter.

However, in the case of forming the silicon oxide film on the metallic thin film, the electrodeposition method cannot be used to form the color filter because the silicon oxide film does not have electric conductivity.

Accordingly, in order to solve the foregoing problems, in the present embodiment, the light transmissive protective film 5 for protecting the reflecting film 4 in electrodeposition is formed on the reflecting film 4, and the electrodepositing transparent conductive layer 6 is formed on the protective film 5, then, the color filter 7 is formed on the electrodepositing transparent conductive layer 6 by the electrodeposition method.

By thus forming the protective film 5 on the reflecting film 4, the reflecting film 4 is prevented from deteriorating when electrodepositing the color filter 7, and the color filter 7 can be electrodeposited because the electrodepositing transparent conductive layer 6 is provided.

Additionally, the color filter 7 formed by the electrodeposition method has superior film flatness compared with color filters formed by other methods such as the pigment dispersing method and printing method, and it is possible to form a thin film and increase transmissivity with ease. Furthermore, with regard to the color filters 27 and 7 formed by the electrodeposition method, it is possible to form a film of uniform thickness regardless of whether the reflectional function layer is the reflecting film 24 of a specular form or the reflecting film 4 of an irregular form. Therefore, the color filters 27 and 7 are suitable for reflection-type LCD devices.

As a result, it is possible to provide a manufacturing method of the reflection-type color LCD devices 10 and 20 which can accurately form the color filters 7 and 27 with the resin black matrix 7b which is suitable for reflection-type LCD devices, respectively on the reflecting films 4 and 24 provided within a liquid crystal cell.

Further, in the manufacturing method of the reflection-type color LCD device 10 of the present embodiment, when forming the color filter 7 by the electrodeposition method, the electrodepositing transparent conductive layer 6 is first formed on the protective film 5, then, the photosensitive resin composition layer is formed on the electrodepositing transparent conductive layer 6.

Next, after exposing the photosensitive resin composition layer via a mask having a monochromatic color-filter color pattern, the exposed portion is removed so as to uncover the surface of the electrodepositing transparent conductive layer 6, and a color layer is formed on the uncovered portion of the electrodepositing transparent conductive layer 6 by the electrodeposition method, thereby forming the color pattern 7a of, for example, R (red).

Next, after exposing the photosensitive resin composition layer via a positive mask having another monochromatic color-filter color pattern, the exposed portion is removed so as to uncover the surface of the electrodepositing transparent conductive layer 6, and the process of forming the color layer on the uncovered electrodepositing transparent conductive layer 6 by the electrodeposition method is repeated so that the color layers composed of the color patterns 7a of plural colors are formed, thereby forming the color layers of the other colors of G (green) and B (blue) in juxtaposition.

Next, the photosensitive resin composition layer, which exists between the color patterns 7a of plural colors, is removed by exposing the whole area thereof, then, black electrodeposition for forming the resin black matrix 7b on the uncovered portion of the electrodepositing transparent conductive layer 6 is performed. As a result, the color filter 7 having the resin black matrix 7b is formed on the electrodepositing transparent conductive layer 6.

In this way, in the present embodiment, the protective film 5 is provided under the electrodepositing transparent conductive layer 6.

This allows the conventionally problematic formation of the resin black matrix 7b to be performed by the electrodeposition method without affecting the reflectional function layer, thus providing suitable means to form the color filter 7 for the glass substrate 1a having the reflecting film 4.

More specifically, by forming the protective film 5 on the reflecting film 4, the reflecting film 4 is prevented from deteriorating when electrodepositing the color filter 7, and the color filter 7 can be electrodeposited because the electrodepositing transparent conductive layer 6 is provided.

Additionally, the color filter 7 of the present embodiment, which is formed by the electrodeposition method, has superior film flatness compared with color filters formed by other methods such as the pigment dispersing method and printing method, and it is possible to form a thin film and increase transmissivity with ease. Furthermore, with regard to the color filters 27 and 7 formed by the electrodeposition method, it is possible to form a film of uniform thickness regardless of whether the reflectional function layer is the reflecting film 24 of a specular form or the reflecting film 4 of an irregular form. Thus, the color filter which is suitable for reflection-type LCD devices can be provided.

As a result, it is possible to provide the reflection-type color LCD devices 10 and 20 which can accurately form the color filters 7 and 27 with the resin black matrix 7b which is suitable for reflection-type LCD devices, respectively on the reflecting films 4 and 24 provided within the liquid crystal cell, and the manufacturing method of such reflection-type color LCD devices.

Further, the reflection-type color LCD device 10 has an arrangement in which a pair of the glass substrates 1a and 1b sandwich the color filter 7, the overcoat layer 8, the lower driving electrode ITO 9, the alignment film 11, the liquid crystal layer 12, the alignment film 13 and the upper driving electrode ITO 15, which are disposed in this order.

Namely, the color filter 7 is provided outside of the region between a pair of the lower driving electrode ITO 9 and upper driving electrode ITO 15, and it is avoided that an insulating film such as the color filter 7 is formed between a pair of the lower driving electrode ITO 9 and upper driving electrode ITO 15. As a result, display quality can be improved in the reflection-type color LCD device 10 of the present embodiment.

Further, the reflection-type color LCD device 10 can suitably be used in small or medium sized reflection-type color LCD devices because, in the case where the electrodepositing transparent conductive layer 6 as the electrodepositing electrode is formed substantially all over a display area of the liquid crystal device as in the present embodiment, in a large liquid crystal display device of 8 inches or larger for example, the effect of a capacity component, which is composed between the electrodepositing transparent conductive layer 6 and the lower driving electrode and upper driving electrode ITOs 9 and 15, appears greatly on a display.

Further, in the manufacturing method of the reflection-type color LCD device 10 of the present embodiment, by forming the protective film 5 on the reflecting film 4, the reflecting film 4 is prevented from deteriorating when electrodepositing the color filter 7, and the color filter 7 can be electrodeposited because the electrodepositing transparent conductive layer 6 is provided.

Thus, the purpose of providing the protective film 5 and electrodepositing transparent conductive layer 6 may be considered attained at the end of manufacture, except for their detachment prevention function.

However, the present embodiment allows active utilization of the protective film 5 and the electrodepositing transparent conductive layer 6 even after finishing manufacture.

More specifically, in the present embodiment, the protective film 5 and the electrodepositing transparent conductive layer 6 have an enhanced reflection film function, i.e. a function to enhance reflectance.

Accordingly, by adding the enhanced reflection film function to the protective film 5 and the electrodepositing transparent conductive layer 6 which might otherwise have become unnecessary once the color filter 7 was formed and increased the number of manufacturing steps, which is a drawback of the electrodeposition method, contrast and brightness required for the reflection-type color LCD device 10 can surely be improved, thus effectively utilizing the protective film 5 and electrodepositing transparent conductive layer 6.

Further, in the reflection-type color LCD device 10 of the present embodiment, the film thickness of the protective film 5 and that of the electrodepositing transparent conductive layer 6 are determined to independently satisfy $$(2m+1)\lambda/4n \times \cos 30°$$

(m: an integer of not less than 0, $\lambda$: a wavelength of incident light, and n: a refractive index of each film).

Namely, by thus setting the film thickness of the protective film 5 and that of the electrodepositing transparent conductive layer 6 to have the enhanced reflection film function, the spectral reflectance of light in the visible light spectrum can be improved while maintaining light transmissivity of the protective film 5 and electrodepositing transparent conductive layer 6.

Further, the reason the conditional equation of the present embodiment includes cos 30° is that an angle of incidence of ideal incident light in external light reflection display is set at 30°, i.e. the incident ray of the ideal incident light is tilted by 30° with respect to normal to the surface of the reflecting film 4.

Further, in the reflection-type color LCD device 10 of the present embodiment, the film thickness of the electrodepositing transparent conductive layer 6 is set in a range of not less than 600 Å to not more than 800 Å.

Namely, when the film thickness of the electrodepositing transparent conductive layer 6 is less than 600 Å, a resistance of the conductive film increases, which results in great variation in film thickness of the color filter 7 which was electrodeposited, while the effect of the enhanced reflection film cannot be expected when the film thickness is more than 800 Å.

Accordingly, if within the foregoing range, it is possible to provide a reflection-type color LCD device which can accurately form the color filter 7 including the resin black matrix 7b suitable for reflection-type LCD devices, on the reflecting film 4 provided within the liquid crystal cell.

Note that, in the present embodiment, although the glass substrates 1a and 1b are used as a substrate, the substrate is not necessarily limited to these. Other than glass, a substrate made of plastic can also be used as the substrate. In addition, the display mode of a liquid crystal, such as TN and STN, is not limited either.

SECOND EMBODIMENT

Figure 3:
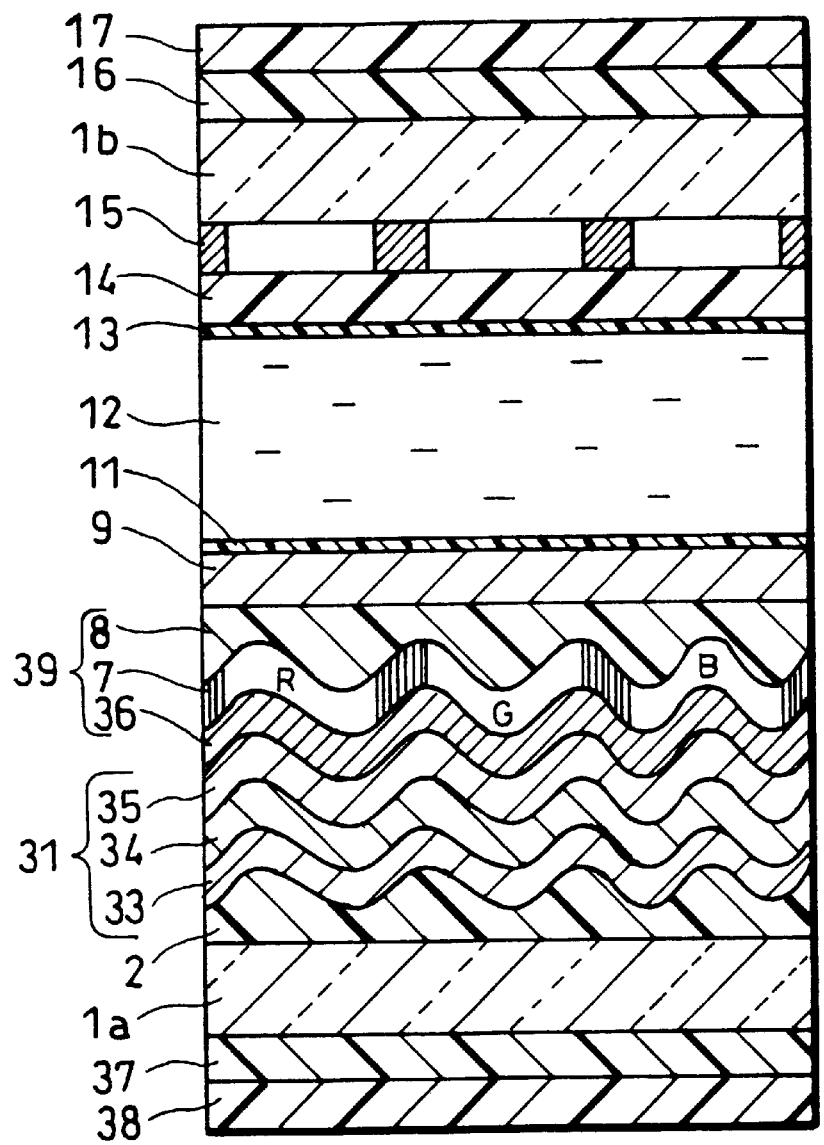
FIG. 3 is a cross section showing a semi-transmissive diffuse-type color liquid crystal display device as one example of a reflection-type color liquid crystal display device according to another embodiment of the present invention.
Figure 4:
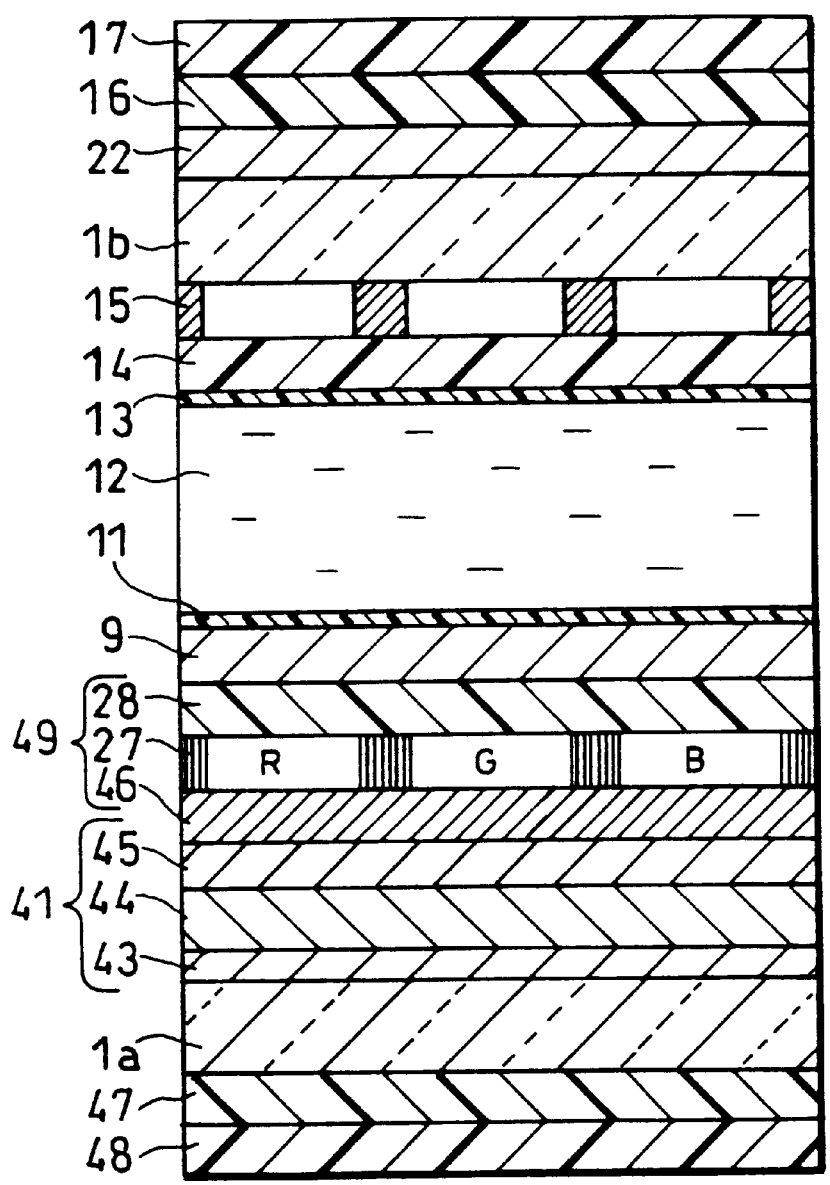
FIG. 4 is a cross section showing a semi-transmissive diffuse-type color liquid crystal display device as another example of the reflection-type color liquid crystal display device according to the embodiment.

The following will explain another embodiment of the present invention with reference to FIGS. 3 and 4. For ease of explanation, components having the same functions as those shown in the drawings pertaining to the First Embodiment above will be given the same reference numerals, and explanation thereof will be omitted here.

In the First Embodiment above, the reflecting medium 21 is made to completely reflect incident light from an upper direction.

However, the present invention is not particularly limited in this regard, and as shown in FIGS. 3 and 4, for example, reflecting media 31 and 41 having a semi-transmissive reflecting plate may be used instead.

More specifically, as shown in FIG. 3, a reflecting film 34 as a reflectional function layer is a semi-transmissive reflecting plate in a diffuse-reflection-type color LCD device 30. In addition, a phase difference plate 37 and a polarizing plate 38 are stacked under a glass substrate 1a. Furthermore, with regard to film thickness of the reflecting medium 31, an undercoat film 33 made of $SiO_2$ is 150 Å, the reflecting film 34 made of Al is 250 Å and a protective film 35 made of $SiO_2$ is 300 Å. With regard to a color-filter layer 39, the film thickness of an electrodepositing electrode 36 made of $SiO_2$ is 1,000 Å.

Namely, in comparison with the reflection-type color LCD device 10 as shown in FIG. 1, the film thickness of the reflecting film 34 made of Al in the reflecting medium 31 is 250 Å which is ¼ of the film thickness 1,000 Å of the reflecting film 4 made of Al in the reflecting medium 18. Further, comparing the film thickness of the protective film 5 with that of the protective film 35, both of which are made of $SiO_2$, the former is 850 Å and the latter 300 Å. Further, comparing the film thickness of the electrodepositing transparent conductive layer 6 with that of the electrodepositing electrode 36, both of which are made of ITO, the former is 700 Å and the latter 1,000 Å.

Note that, these film thicknesses were determined without making the films enhanced reflection films, but by a balance between the transmitted light and reflected light. Accordingly, the values of film thickness are not limited either.

Additionally, as shown in FIG. 4, the film thicknesses in a specular-reflection-type color LCD device 40 are the same as those in the diffuse-reflection-type color LCD device 30.

Namely, in a reflecting medium 41, the film thickness of an undercoat film 43 made of $SiO_2$ is 150 Å, a reflecting film 44 made of Al is 250 Å and a protective film 45 made of $SiO_2$ 300 Å. With regard to a color-filter layer 49, the film thickness of an electrodepositing electrode 46 made of $SiO_2$ is 1,000 Å.

Thus, in the diffuse-reflection-type color LCD device 30 and the specular-reflection-type color LCD device 40 of the present embodiment, by forming the protective films 35 and 45 on the reflecting films 34 and 44, respectively, the reflecting films 33 and 44 are prevented from deteriorating when electrodepositing the color filters 7 and 27, and the color filters 7 and 27 can be electrodeposited because the electrodepositing transparent conductive layers 36 and 46 are provided.

Consequently, it is possible to provide a manufacturing method of the semi-transmissive reflection-type color LCD device which can accurately form the color filters 7 and 27 with the resin black matrix 7b suitable for reflection-type LCD devices, respectively on the reflecting films 34 and 44 provided within the liquid crystal cell, and the semi-transmissive reflection-type color LCD device.

EXAMPLES

Here, reflectance with respect to wavelength was measured at various film thicknesses of the electrodepositing transparent conductive layer 6 made of ITO, using a $SiO_2$ film as the silicon oxide film of the reflection-type color liquid crystal display device of the First Embodiment.

As experimental conditions, (i) the film thickness of the reflecting film 4 made of Al was fixed at the film thickness value of 1,000 Å by which reflection characteristics of the reflecting film 4 made of Al could sufficiently be obtained, and (ii) the film thickness of the protective film 5 made of $SiO_2$ was set at 850 Å to adapt to the foregoing theoretical value. Under such conditions, change in reflectance at varying film thickness of the electrodepositing transparent conductive layer 6, and deposition of the color filter 7 were measured.

The result, as shown in FIG. 5, showed that, when the film thickness of the electrodepositing transparent conductive layer 6 was less than 600 Å, the resistance of the conductive film increased and variation in the film thickness of the electrodeposited color filter 7 became large, whereas the effect of the enhanced reflection layer could not be expected when the film thickness of the electrodepositing transparent conductive layer 6 was more than 800 Å.

Meanwhile, as a comparative example, electro-deposition was performed by adopting the reflecting film 4 made of Al as the electrodepositing electrode, without forming the protective film 5 made of $SiO_2$ and the electrodepositing transparent conductive layer 6 made of ITO on the reflecting film 4 made of Al.

In this case, Al melted by a developer when patterning the color filter 7.

As explained, a first manufacturing method of a reflection-type color LCD device of the present invention which includes a reflectional function layer, a color filter in which a resin black matrix is formed between color-filter color patterns, and a liquid crystal layer, which are sandwiched between a pair of substrates in this order, includes the steps of forming a light transmissive protective film for protecting the reflectional function layer when electrodepositing on the reflectional function layer, and forming an electrodepositing transparent conductive layer on the protective film, and forming the color filter by an electrodeposition method on the electrodepositing transparent conductive layer.

The reflection-type color LCD device according to the foregoing method has an arrangement in which the reflectional function layer, the color filter including the resin black matrix formed between the color-filter color patterns, and the liquid crystal layer are sandwiched between the pair of substrates in this order.

By thus providing the color filter and the reflectional function layer within a liquid crystal cell, i.e. between the pair of substrates, it is possible to avoid problems such as mixed colors due to parallax, and considerable reduction in reflectance and chroma, as observed in the case where the reflectional function layer and the color filter are provided via the substrate in between.

Further, in order to protect the reflectional function layer which is formed on one of the pair of substrates from adverse effects of the electrodeposition of the color filter, the light transmissive protective film is formed on the reflectional function layer.

In addition, on the protective film, the electrodepositing transparent conductive layer which is used as the electrodepositing electrode is formed, and the color filter is formed on the electrodepositing transparent conductive layer by the electrodeposition method.

Here, in the present invention, the protective layer is provided under the electrodepositing transparent conductive layer.

This allows the conventionally problematic formation of the resin black matrix to be performed by the electrodeposition method without affecting the reflectional function layer, thus providing suitable means to form the color filter for the substrate having the reflectional function layer.

Namely, the resin black matrix as the light shielding film is formed in such a way that the resist between the color layers which have been formed in advance is removed entirely by exposure over the entire surface and development thereafter, so as to perform black electrodeposition on the exposed portion of the electrodepositing transparent conductive layer, making it possible to adopt a self alignment method which differs from the conventionally problematic methods such as the back-face exposure self alignment method and printing method in which colors may overlap.

In addition, it is also an important advantage of the present embodiment to form the protective film between the reflectional function layer and the electrodepositing transparent conductive layer.

Namely, in the conventional methods, when adopting the color filter by the electrodeposition method, a metallic thin film as the reflectional function layer which has been formed on the glass substrate is used as the electrodepositing electrode, and the color filter is electrodeposited on this metallic thin film.

However, a problem arises in this case: the metallic thin film cannot be used as the reflectional function layer because the metallic thin film melts during a development process of patterning the color-filter.

That is, in the conventional electrodeposition method, for example, a transparent conductive layer and a positive photosensitive resin composition layer are formed on a substrate. Then, a mask (positive mask) having a predetermined pattern is laid and exposed on this positive photosensitive resin composition layer, which are then eluted with a predetermined eluate. Next, a current is flown through the transparent conductive layer, and for example, a color filter of red is electrodeposited on the transparent conductive layer in an electrodeposition bath. Repeating the same process, the photosensitive resin composition layer having colored portions is obtained. Next, by entire light exposure and elution in the eluate, a transparent conductive layer on which filters of R (red), G (green) and B (blue) are placed is formed. However, the electrodepositing electrode is corroded by the developer when eluting the positive photosensitive resin composition layer. Here, when using the metallic thin film as the electrodepositing electrode, the developer melts the metallic thin film, and the metallic thin film cannot be used as the reflectional function layer.

Meanwhile, as the method of protecting the metallic thin film, there has been a known method of forming a color filter by using a pigment dispersing method or a printing method, and by forming a silicon oxide film on a metallic thin film so that resistance to resist stripper is given when forming the color filter.

However, in the case of forming the silicon oxide film on the metallic thin film, the electrodeposition method cannot be used to form the color filter because the silicon oxide film does not have electric conductivity.

Accordingly, in order to solve the foregoing problems, in the present invention, the light transmissive protective film for protecting the reflectional function layer in electrodeposition is formed on the reflectional function layer, and the electrodepositing transparent conductive layer is formed on the protective film, then, the color filter is formed on the electrodepositing transparent conductive layer by the electrodeposition method.

By thus forming the protective film on the reflectional function layer, the reflectional function layer is prevented from deteriorating when electrodepositing the color filter, and the color filter can be electrodeposited because the electrodepositing transparent conductive layer is provided.

Additionally, the color filter formed by the electrodeposition method has superior film flatness compared with color filters formed by other methods such as the pigment dispersing method and printing method, and it is possible to form a thin film and increase transmissivity with ease. Furthermore, with regard to the color filter formed by the electrodeposition method, it is possible to form a film of uniform thickness regardless of whether the reflectional function layer is of a specular form or of an irregular form. Thus, the color filter is suitable for reflection-type LCD devices.

As a result, it is possible to provide a manufacturing method of the reflection-type color LCD device which can accurately form the color filter including the resin black matrix which is suitable for reflection-type LCD devices on the reflectional function layer provided within a liquid crystal cell.

A second manufacturing method of a reflection-type color LCD device of the present invention which includes a reflectional function layer, a color filter in which a resin black matrix is formed between color-filter color patterns, and a liquid crystal layer, which are sandwiched between a pair of substrates in this order, includes the steps of forming a light transmissive protective film for protecting the reflectional function layer when electrodepositing on the reflectional function layer on one of the pair of substrates; and, to form said color filter, forming an electrodepositing transparent conductive layer on the protective film; and forming a photosensitive resin composition layer on the electrodepositing transparent conductive layer; and uncovering a surface of the electrodepositing transparent conductive layer after exposing the photosensitive resin composition layer through a mask having a monochromatic color-filter color pattern and by removing the exposed portion; and forming color layers by electrodeposition on the transparent conductive layer which was uncovered, and forming color layers composed of color-filter color patterns of plural colors by repeating a step of uncovering the surface of the electrodepositing transparent conductive layer after exposing the photosensitive resin composition layer through a mask having another monochromatic color-filter color pattern and by removing the exposed portion, and forming color layers by electrodeposition on the transparent conductive layer which was uncovered; and removing a photosensitive resin composition by exposing an entire surface of the photosensitive resin composition layer which exists between the color layers composed of the color-filter color patterns of plural colors; and performing black electrodeposition for forming the resin black matrix over the uncovered portion of the electrodepositing transparent conductive layer.

The reflection-type color LCD device according to the foregoing method has an arrangement in which the reflectional function layer, the color filter in which the resin black matrix is formed between the color-filter color patterns, and the liquid crystal layer are sandwiched between the pair of substrates in this order.

By thus providing the color filter and the reflectional function layer within the liquid crystal cell, i.e. between the pair of substrates, it is possible to avoid problems such as mixed colors due to parallax, and considerable reduction in reflectance and chroma, as observed in the case where the reflectional function layer and the color filter are provided via the substrate in between.

Further, in order to protect the reflectional function layer which is formed on one of the pair of substrates from the adverse effects of the electrodeposition of the color filter, the light transmissive protective film is formed on the reflectional function layer.

In addition, on this protective film, the electrodepositing transparent conductive layer which is used as the electrodepositing electrode is formed, and the color filter is formed on the electrodepositing transparent conductive layer by the electrodeposition method.

When forming the color filter by the electrodeposition method, the electrodepositing transparent conductive layer is first formed on the protective film, then, the photosensitive resin composition layer is formed on the electrodepositing transparent conductive layer.

Next, after exposing the photosensitive resin composition layer via a mask having a monochromatic color-filter color pattern, the exposed portion is removed so as to uncover the surface of the electrodepositing transparent conductive layer, and color layers are formed on the uncovered portion of the electrodepositing transparent conductive layer by the electrodeposition method, thereby forming the color pattern of, for example, R (red).

Next, after exposing the photosensitive resin composition layer via a mask having another monochromatic color-filter color pattern, the exposed portion is removed so as to uncover the surface of the electrodepositing transparent conductive layer, and the process of forming the color layers on the uncovered electrodepositing transparent conductive layer by the electrodeposition method is repeated so that the color layers composed of the color-filter color patterns of plural colors are formed, thereby forming the color layers of the other colors of G (green) and B (blue) in juxtaposition.

Next, the photosensitive resin composition layer, which exists between the color layers composed of the color-filter color patterns of plural colors, is removed by exposing the whole area thereof, then, black electrodeposition for forming the resin black matrix on the uncovered portion of the electrodepositing transparent conductive layer is performed.

As a result, the color filter having the resin black matrix is formed on the electrodepositing transparent conductive layer.

By thus providing the protective layer under the electrodepositing transparent conductive layer, the formation of the resin black matrix can be performed by the electrodeposition method without affecting the reflectional function layer unlike the conventional formation of the resin black matrix which affected the reflectional function layer by the electrodeposition method, thus providing suitable means to form the color filter for the substrate having the reflectional function layer.

Namely, by forming the protective film on the reflectional function layer, the reflectional function layer is prevented from deteriorating when electrodepositing the color filter, and the color filter can be electrodeposited because the electrodepositing transparent conductive layer is provided.

Further, the color filter of the present invention which is formed by the electrodeposition method has superior film flatness compared with color filters formed by other methods such as the pigment dispersing method and printing method, and it is possible to form a thin film and increase transmissivity with ease. Furthermore, with regard to the color filter formed by the electrodeposition method, it is possible to form a film of uniform thickness regardless of whether the reflectional function layer is of a specular form or of an irregular form. Thus, according to the method of the present invention, the color filter which is suitable for reflection-type LCD devices can be provided.

As a result, it is possible to provide the manufacturing method of the reflection-type color LCD device which can accurately form the color filter including the resin black matrix suitable for reflection-type color LCD devices on the reflectional function layer provided within the liquid crystal cell.

As discussed, a first reflection-type color LCD device of the present invention which includes a reflectional function layer, a color filter including a resin black matrix formed between color-filter color patterns, and a liquid crystal layer, which are sandwiched between a pair of substrates in this order has an arrangement in which a light transmissive protective film for protecting a reflectional function layer when electrodepositing is formed on the reflectional function layer which is formed on one of the pair of substrates, and an electrodepositing transparent conductive layer is formed on the protective film, and a color filter made up of color layers and the resin black matrix is provided on the electrodepositing transparent conductive layer, the color layers being made up of the color-filter color patterns of plural colors which have been formed by an electrodeposition method, and the resin black matrix being formed between the color layers which are composed of the color-filter color patterns of plural colors.

In the foregoing structure, the first reflection-type color LCD device has an arrangement in which the reflectional function layer, the color filter including the resin black matrix formed between color-filter color patterns, and the liquid crystal layer are sandwiched between the pair of substrates in this order.

By thus providing the color filter and the reflectional function layer within the liquid crystal cell, i.e. between the pair of substrates, it is possible to avoid problems such as mixed colors due to parallax, and considerable reduction in reflectance and chroma, as observed in the case where the reflectional function layer and the color filter are provided via the substrate in between.

Further, the reflection-type color LCD device according to the present invention has an arrangement in which the light transmissive protective film for protecting the reflectional function layer in electrodeposition is provided on the reflectional function layer which is provided on one of the substrates, and the electrodepositing transparent conductive layer is provided on the protective film, and on the electrodepositing transparent conductive layer there is provided the color filter which is composed of the color layers which are composed of the color-filter color patterns of plural colors formed by electrodeposition and the resin black matrix which was formed by electrodeposition between the color layers composed of the color-filter color patterns of plural colors.

Namely, the light transmissive protective film for protecting the reflectional function layer when electrodepositing is formed on the reflectional function layer, and the electrodepositing transparent conductive layer is formed on the protective film, and the color filter is formed on the electrodepositing transparent conductive layer by the electrodeposition method.

By thus forming the protective film on the reflectional function layer, the reflectional function layer is prevented from deteriorating when electrodepositing the color filter, and the color filter can be electrodeposited because the electrodepositing transparent conductive layer is provided.

Further, the color filter which is formed by the electrodeposition method has superior film flatness compared with color filters formed by other methods such as the pigment dispersing method and printing method, and it is possible to form a thin film and increase transmissivity with ease. Furthermore, with regard to the color filter formed by the electrodeposition method, it is possible to form a film of uniform thickness regardless of whether the reflectional function layer is of a specular form or of an irregular form. Thus, the color filter is suitable for reflection-type LCD devices.

As a result, it is possible to provide the reflection-type color LCD device which can accurately form the color filter including the resin black matrix suitable for reflection-type color LCD devices on the reflectional function layer provided within the liquid crystal cell.

A second reflection-type color LCD device of the present invention, in the first reflection-type color LCD device, has an arrangement in which a leveling film, a display electrode, an alignment film, a liquid crystal layer, an alignment film and a display electrode are disposed in this order on the color filter between a pair of substrates.

In the foregoing structure, the leveling film, the display electrode, the alignment film, the liquid crystal layer, the alignment film and the display electrode are disposed in this order on the color filter between the pair of substrates.

Accordingly, the color filter is formed outside of a region between layers of a pair of display electrodes, and it is avoided that an insulating film such as the color filter is formed between the pair of display electrodes, thereby improving display quality of the reflection-type color LCD device.

Further, the foregoing reflection-type color LCD device is suitably used in small or medium sized reflection-type color LCD devices because in the case where the electrodepositing transparent conductive layer as the electrodepositing electrode is formed substantially all over a display area of the liquid crystal device as in the present invention, in a large liquid crystal display device of 8 inches or larger for example, the effect of a capacity component, which is composed between the electrodepositing transparent conductive layer and the display electrodes, appears greatly on a display.

A third reflection-type color LCD device of the present invention, in the foregoing structure of either the first or second reflection-type color LCD device, has such an arrangement in which the protective film and the electrodepositing transparent conductive layer have an enhanced reflection film function.

In the foregoing structure, by forming the protective film on the reflectional function layer, the reflectional function layer is prevented from deteriorating when electrodepositing the color filter, and the color filter can be electrodeposited because the electrodepositing transparent conductive layer is provided.

Thus, the purpose of providing the protective film and electrodepositing transparent conductive layer may be considered attained at the end of manufacture, except for their detachment prevention function.

However, the present invention allows active utilization of the protective film and electrodepositing transparent conductive layer even after finishing manufacture.

More specifically, in the present invention, the protective film and the electrodepositing transparent conductive layer have an enhanced reflection film function, i.e. a function to enhance reflectance.

Accordingly, by adding the enhanced reflection film function to the protective film and the electrodepositing transparent conductive layer which might otherwise have become unnecessary once the color filter was formed and increased the number of manufacturing steps, which is a drawback of the electrodeposition method, contrast and brightness required for the reflection-type color LCD device can surely be improved, thus effectively utilizing the protective film and the electrodepositing transparent conductive layer.

A fourth reflection-type color LCD device, in the foregoing third reflection-type color LCD device, has an arrangement in which the film thickness of the protective film and that of the electrodepositing transparent conductive layer are independently determined to satisfy $$(2m+1)\lambda/4n \times \cos 30°$$

(m: an integer of not less than 0, $\lambda$: a wavelength of incident light, and n: a refractive index of each film).

In the foregoing structure, the film thickness of the protective film and that of the electrodepositing transparent conductive layer are independently determined to satisfy $$(2m+1)\lambda/4n \times \cos 30°$$

(m: an integer of not less than 0, $\lambda$: a wavelength of incident light, and n: a refractive index of each film).

Namely, by thus setting the film thickness of the protective film and that of the electrodepositing transparent conductive layer to have the enhanced reflection film function, the spectral reflectance of light in the visible light spectrum can be improved while maintaining light transmissivity of the protective film and the electrodepositing transparent conductive layer.

Further, the reason the conditional equation of the present embodiment includes cos 30° is that an angle of incidence of ideal incident light in external light reflection display is set at 30°, i.e. the incident ray of the ideal incident light is tilted by 30° with respect to normal to the surface of the reflectional function layer.

A fifth reflection-type color LCD device of the present invention has an arrangement in which, in the foregoing structure of either of the first through fourth reflection-type color LCD devices, the film thickness of the electrodepositing transparent conductive layer is set in a range of not less than 600 Å to not more than 800 Å.

According to the foregoing experimental results, when the film thickness of the electrodepositing transparent conductive layer is less than 600 Å, a resistance of the conductive film increases, which results in great variation in the film thickness of the color filter which was electrodeposited, while the effect of the enhanced reflection film cannot be expected when the film thickness is more than 800 Å.

Accordingly, by setting the film thickness of the electrodepositing transparent conductive layer within a range of not less than 600 Å to not more than 800 Å as in the foregoing arrangement, it is possible to provide a reflection-type color LCD device which can accurately form the color filter including the resin black matrix suitable for reflection-type LCD devices on the reflectional function layer provided within the liquid crystal cell.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A manufacturing method of a reflection-type color liquid crystal display device which includes a reflectional function layer, a color filter in which a resin black matrix is formed between color-filter color patterns, and a liquid crystal layer, which are sandwiched between a pair of substrates in this order, said method comprising the steps of:
    (A) forming a light transmissive protective film on the reflectional function layer, the light transimissive protective film for protecting the reflectional function layer when electrodepositinig;
    (B) forming an electrodepositing transparent conductive layer on the protective film; and
    (C) electrodepositing the color filter on the electrodepositing transparent conductive layer;
       wherein the electrodepositing transparent conductive layer is formed directly over the protective film to protect the reflectional function layer during the electrodepositing step.

2. The method as set forth in claim 1, wherein:
in said step (A), a silicon oxide film is formed as the protective film.

3. The method as set forth in claim 1, wherein:
in said step (B), an Indium Tin Oxide film is formed as the electrodepositing transparent conductive layer.

4. The method as set forth in claim 1 wherein said step (C) includes the steps of:
    (a) forming a photosensitive resin composition layer on the electrodepositing transparent conductive layer;
    (b) exposing the photosensitive resin composition layer through a mask having a predetermined pattern, and thereafter uncovering a surface of the transparent conductive layer by removing an exposed portion of the photosensitive resin composition layer;
    (c) forming color layers by electrodeposition on the transparent conductive layer which was uncovered in said step (b);
    (d) removing a photosensitive resin composition by exposing the photosensitive resin composition layer between the color layers; and
    (e) performing black electrodeposition on the transparent conductive layer which was uncovered in said step (d).

5. The method as set forth in claim 4, wherein:
by repeating said step (b) and step (c), color layers of a predetermined color are formed.

6. The method as set forth in claim 1, wherein:
said reflectional function layer includes a diffuse reflecting film having irregular surfaces.

7. The method as set forth in claim 1, wherein:
said reflectional function layer includes a reflecting film having flat surfaces.

8. The method as set forth in claim 1, wherein:
said reflectional function layer includes a semi-transmissive reflecting plate.

9. A manufacturing method of a reflection-type color liquid crystal display device which includes a reflectional function layer, a color filter in which a resin black matrix is formed between color-filter color patterns, and a liquid crystal layer, which are sandwiched between a pair of substrates in this order, said method comprising the step of:
    forming a light transmissive protective film on the reflectional function layer which is formed on one of the pair of substrates, the light transmissive protective film for protecting the reflectional function layer when electrodepositing;
    forming an electrodepositing transparent conductive layer on the protective film, wherein the electrodepositing transparent conductive layer is formed directly over the protective film to protect the reflectional function layer during electrodeposition;
    forming a photosensitive resin composition layer on the electrodepositing transparent conductive layer;
    uncovering a surface of the electrodepositing transparent conductive layer after exposing the photosensitive resin composition layer through a mask having a monochromatic color-filter color pattern and by removing the exposed portion, and forming color layers by electrodeposition on the transparent conductive layer which was uncovered;
    forming color layers composed of color-filter color patterns of plural colors by repeating a step of uncovering the surface of the electrodepositing transparent conductive layer after exposing the photosensitive resin composition layer through a mask having another monochromatic color-filter color pattern and by removing the exposed portion, and forming color layers by electrodeposition on the transparent conductive layer which was uncovered;
    removing a photosensitive resin composition by exposing an entire surface of the photosensitive resin composition layer which exists between the color layers composed of the color-filter color patterns of plural colors; and
    performing black electrodeposition for forming the resin black matrix over the uncovered portion of the electrodepositing transparent conductive layer.

10. A reflection-type color liquid crystal display device, comprising:
    a pair of substrates;
    a reflectional function layer;
    a light transmissive protective film formed on the reflectional function layer for protecting the reflectional function layer when electrodepositing;
    an electrodepositing transparent conductive layer formed directly over the protective film to protect the reflectional function layer during electrodepositing;
    a color filter in which a resin black matrix is formed between color-filter color patterns of plural colors, the resin black matrix and the color patterns being electrodeposited on the electrodepositing transparent conductive layer; and
    a liquid crystal layer,
    said reflectional function layer, said light transmissive protective film, said electrodepositing transparent conductive layer, said color filter and said liquid crystal layer being formed in this order from one of the pair of substrates.

11. The reflection-type color liquid crystal display device as set forth in claim 10, wherein:
   said reflectional function layer includes a diffuse reflecting film having irregular surfaces.

12. The reflection-type color liquid crystal display device as set forth in claim 10, wherein:
   said reflectional function layer includes a reflecting film having flat surfaces.

13. The reflection-type color liquid crystal display device as set forth in claim 10, wherein:
   said reflectional function layer includes a semi-transmissive reflecting plate.

14. The reflection-type color liquid crystal display device as set forth in claim 10, further comprising:
   a pair of opposing display electrodes sandwiching the liquid crystal layer,
   wherein said color filter is provided outside of a region between the pair of opposing display electrodes.

15. The reflection-type color liquid crystal display device as set forth in claim 10, wherein:
   a leveling film, a display electrode, an alignment film, the liquid crystal layer, an alignment film and a display electrode are disposed in this order on the color filter between the pair of substrates.

16. The reflection-type color liquid crystal display device as set forth in claim 10, wherein:
   said protective film has an enhanced reflection film function.

17. The reflection-type color liquid crystal display device as set forth in claim 16, wherein:
   said electrodepositing transparent conductive layer has the enhanced reflection film function.

18. The reflection-type color liquid crystal display device as set forth in claim 17, wherein:
   a film thickness of said protective film and that of said electrodepositing transparent conductive layer are independently set to satisfy $$(2m+1)\lambda/4n \times \cos 30°$$

(m: an integer of not less than 0, $\lambda$: a wavelength of incident light and n: a refractive index of each film).

19. The reflection-type color liquid crystal display device as set forth in claim 10, wherein:
   a film thickness of said electrodepositing transparent conductive layer ranges from not less than 600 Å to not more than 800 Å.

20. The reflection-type color liquid crystal display device as set forth in claim 10, wherein:
   a film thickness of said electrodepositing transparent conductive layer is substantially 700 Å.

* * * * *